United States Patent [19]

Peters

[11] 4,231,314
[45] Nov. 4, 1980

[54] HYDROPLANE BOAT

[76] Inventor: Michael Peters, 2700 Severance St., Los Angeles, Calif. 90007

[21] Appl. No.: 878,751

[22] Filed: Feb. 17, 1978

[51] Int. Cl.² .............................................. B63B 1/00
[52] U.S. Cl. ................................... 114/291; 114/289; 114/56
[58] Field of Search ............... 114/291, 289, 271, 288, 114/289, 290, 291, 56, 61, 67 A

[56] References Cited

U.S. PATENT DOCUMENTS

| | | | |
|---|---|---|---|
| 1,765,789 | 6/1930 | Ditchburn | 114/291 |
| 2,244,357 | 6/1941 | Driggs | 114/291 |
| 2,634,698 | 4/1953 | Becker | 114/291 |
| 3,203,389 | 8/1965 | Cale | 114/289 |
| 3,316,874 | 5/1967 | Canazzi | 114/289 |
| 3,547,064 | 12/1970 | Glass | 114/291 |

*Primary Examiner*—Trygve M. Blix
*Assistant Examiner*—D. W. Keen
*Attorney, Agent, or Firm*—Lyon & Lyon

[57] ABSTRACT

A hydroplane boat having a hull with two V-shaped sections separated by a step in the hull surface and continuous chines from stem to stern. The void created by the step is preferably provided with air by vents located between the chines, the vents having intakes internal to the boat structure. The hull includes concave portions just aft of the step separated by a pronounced keelson and tapering into a V-shape at the transom, such that the hull portion aft of the step describes a generally hook shaped surface.

19 Claims, 2 Drawing Figures

HYDROPLANE BOAT

BACKGROUND OF THE INVENTION

The present invention relates generally to hydroplane boats, and more particularly to hydroplane boats having a "deep-V" or a "stepped hull" design.

Hydroplane boats are boats capable of skimming over water with the hull raised wholly or partly clear of the water surface. Boats with this capability have many different designs, but two such designs are of particular pertinence to the present invention. These are the "deep-V" design, generally accepted as the best design for performance in rough water, and the "stepped hull" design, offering the lowest drag and highest speeds among single hulled boats.

In the "deep-V" design, the hull has a continuous surface from bow to stern with a ridge down the central portion thereof, forming a "V" shape when viewed from the stern. The deadrise of such a boat, that is, the angle between the hull surface and a horizontal plane, is generally twenty degrees or more. "Deep-V" boats have an undesirable tendency to pitch severely in rough seas in resonance with the frequency of the wave action. Further, they require powerful, heavy, and uneconomic engines to achieve planing and to overcome the friction between the hull and the water. The lifting characteristics of the continuous hull result in a non-level ride, and the boat exhibits lateral instability at rest. In high speed turns such a boat banks severely, and a large turning radius is required for low speed turns because the boat pivots on its bow. Trim tabs or similar devices are often necessary to provide the necessary lift at the stern area, depending on the orientation of the power unit.

In the "stepped hull" design, the hull comprises two generally flat sections separated by a discrete step running transverse of the hull. When the boat is in motion a vacuum is created just aft of the step as the water pulls away from the hull. To alleviate the vacuum, air is supplied to this area by external vents located in the chine area of the hull. Such external vents, however, create structural weakness in this region of the boat and degradation of the directional stability associated with boats having continuous chines. Also, loss of air supply to the area aft of the step will occur if the vents are even momentarily blocked for any reason, as for example if engulfed by a large wave. The vacuum resulting from such a loss of air supply can lead to an abrupt cessation of planing, causing the boat to slow suddenly in the water. Other disadvantages of a stepped hull design result from the generally flat nature of the hull surfaces. The considerable lifting force exerted on the stern by the flat hull surface causes the bow to plow under the high waves and, in a following sea, may cause the boat to broach by pivoting on the step. Also, without a keelson in the aft portion of the hull surface, a certain amount of directional instability arises.

Although hydroplane boats have been built which attempted to combine the "deep-V" and "stepped hull" designs, such boats have not included continuous chines from stem to stern for structural strength and directional stability, nor have they overcome the problem of sudden deplaning from loss of air supply to the area aft of the step.

SUMMARY OF THE INVENTION

According to the present invention there is provided a hydroplane boat having a V-shaped, stepped hull and continuous chines from stem to stern. In a preferred embodiment, air is supplied to the void aft of the step by vents located between the chines. The vents have intakes located internal to the boat structure. Aft of the step the hull is generally concave on either side of the keelson, tapering into a V-shape at the transom. The hull portion aft of the step thus describes a generally hook shaped surface when viewed from either side.

A boat according to the present invention pivots longitudinally about the step in the hull, thus cancelling out the pitching action of a rough sea and resulting in a smooth ride. Friction is reduced and planing is facilitated by the step in the hull together with the venting of the void created thereby, allowing the use of lighter and more economical engines. A level ride is provided by equal bow and stern lift. The hull section immediately aft of the step is quite flat near the chines, providing improved lateral stability at rest. The boat remains relatively flat during high speed turns due to the horizontal surface of the chine and the flat sections aft of the step and near the chines. During low speed turns the boat pivots on the step, providing a very short turning radius. No corrective devices such as trim tabs are needed because of the natural lift characteristics of the hull portion aft of the step.

The continuous chines prevent the structural weakness associated with prior stepped hull designs and improve directional stability by allowing continuous flow of the water therealong. The step in the hull surface is of a greater height than in the prior art, and thus renders highly unlikely the occurrence of sudden deplaning during operation. The internal venting of the preferred embodiment further reduces the likelihood of sudden deplaning by assuring a continuous supply of air to the area aft of the step even in high seas.

The high aspect ratio of the bow and the V-shaped stern help keep the bow above the waves in rough water. The reduced lifting characteristics of the stern relative to prior stepped hull boats help prevent lateral pivoting that could cause the boat to broach. The keelson behind the step directs water to the transom in a straight path, providing better directional stability prior to planing.

Accordingly, it is an object of the present invention to provide a hydroplane boat with good stability in rough waters.

It is another object of the present invention to provide a stepped-hull hydroplane boat with improved resistance to sudden deplaning.

It is a further object of the present invention to provide a stepped-hull hydroplane boat with continuous chines.

These and other objects and advantages of the present invention will become apparent from the following detailed description taken in conjunction with the accompanying drawings.

DESCRIPTION OF THE PREFERRED EMBODIMENT

Figure 1:
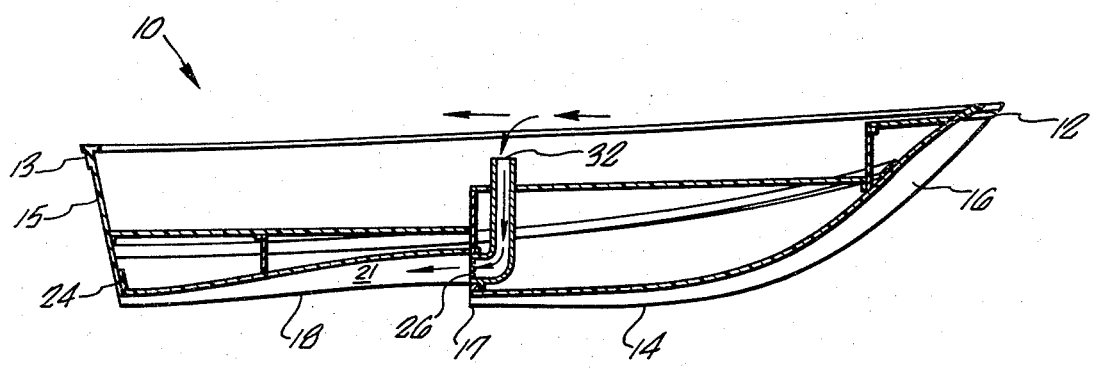
FIG. 1 is a partial cross section of a hydroplane boat according to the present invention, viewed from the starboard side.
Figure 2:
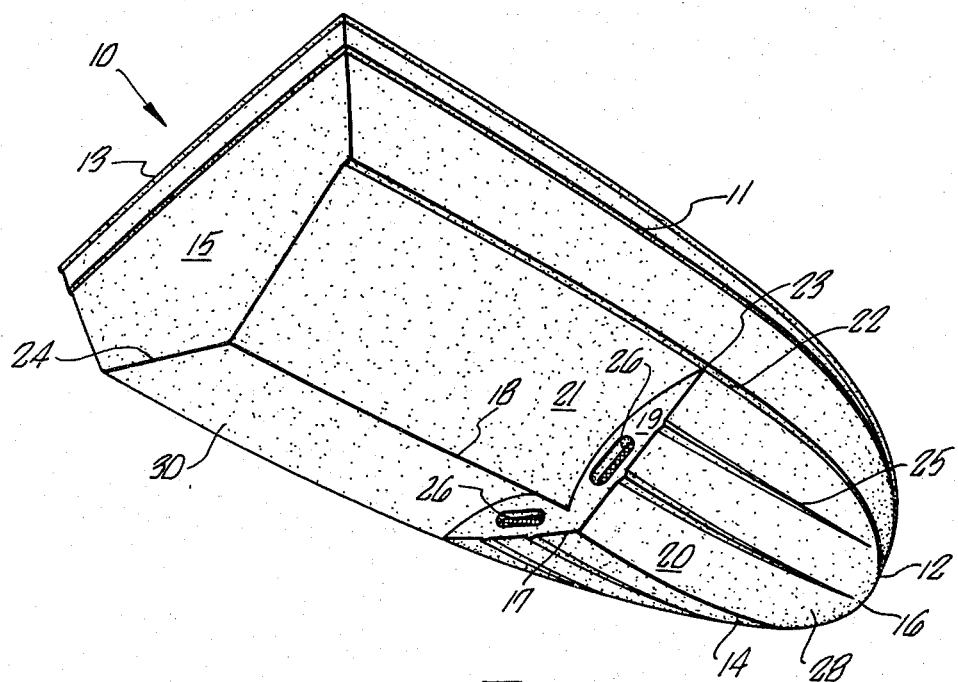
FIG. 2 is a perspective view of a hydroplane boat according to the present invention, viewed from underneath.

Referring now to FIGS. 1 and 2, there is illustrated a hydroplane boat 10 embodying the present invention. The boat 10 has continuous sides 11 from bow 12 to stern 13, and a bottom 20 intersecting the sides 11 to form chines 22. The bottom 20 includes a forward portion 28 and an aft portion 30, separated by a step 17. The chines 22 comprise a narrow horizontal surface that is continuous from stem 16 to stern 15. The forward portion 28 of the bottom 20 is V-shaped and may incorporate lift strakes 25 and a forward keelson 14. The forward portion 28 of the bottom 20 terminates in the step 17, which includes a surface 19. The aft portion 30 of the bottom 20 is hollowed out to form a concave portion 21 before becoming somewhat V-shaped at the transom section 24. The concave portion 21 of the aft portion 30 of the bottom 20 has relatively flat edges near the chines 22 and rises gradually from the intersection 23 of the step surface 19 and the chine 22 toward the center of the aft portion 30 where a raised but somewhat pronounced keel 18 is formed. In the step surface 19 are vents 26 between the chines 22, connected to intakes 32 inside the boat 10 through which air can pass on a demand basis.

The following constitutes the general design specifications of a boat 10 according to the presently preferred embodiment of the present invention.

The sections 28 and 30 of the bottom 20 should be somewhat V-shaped, with deadrise at the stern 15 less than that at the step 17 by between approximately three and ten degrees. Lift strakes 25 should be utilized on the forward portion 28 of the bottom 20 to provide lift if the deadrise of the forward portion 28 exceeds approximately eighteen to twenty degrees.

The step 17 should occur at a point approximately 50% to 60% of the water line length forward of the transom 15, the actual location being determined according to desired speed ranges and stem profiles. The center of gravity should be approximately 5% to 15% of the water line length aft of the step 17, again depending on desired speed ranges.

Maximum chine beam may be made somewhat narrower than that of a similar "deep-V" design if desired. The hollowed portion 21 of the aft section 30 of the bottom 20 should be as deep as possible to receive the vents 26. The raised keelson 18 should intersect the step surface 19 at a point approximately one to one and one-half inches above the base of the forward keelson 14 for each foot of chine beam measured at the step 17.

The aft portion 30 of the bottom 20 should describe a hook-shaped curve from the step surface 19 to the transom section 24, where the aft portion 30 should become somewhat V-shaped. The profile of the stem 16 should describe a gradual curve from the bow 12 to the step 17, leveling somewhat near the step 17.

The intakes 32 should be located internally of the boat 10 well above the water line to supply air on a demand basis to the vents 26. The vents 26 should comprise at least 15% of the step surface 19, or as large a percentage thereof as is structurally practical.

The principles of operation of a boat according to the present invention are as follows. As the boat begins to move, a void forms just aft of the step due to the passage of the water over the bottom portion of the boat just forward of the step. The void is filled with air supplied through the vents, and from any portion of the void exposed above the water surface. Thus the forward and aft portions of the boat bottom are in contact with water and the area just aft of the step is not in contact therewith. The water leaving the step next comes in contact with the boat bottom in the transom area, thus causing the stern to lift. At the same time the forward portion of the boat bottom is creating lift. By means of these simultaneous effects, the boat lifts onto an essentially level plane with no noticeable hump.

When the boat is planing, the step affords good stability fore and aft by providing a pivot about which the lifting forces acting on the bow and transom become equalized. Upon hitting a wave the bow rises, causing the stern to sink until it displaces a quantity of water equal to the lifting force on the bow. The boat thus returns to a level condition and pitching in resonance with the frequency of the waves is damped out rather than amplified. Also, drag due to friction between the water and the hull is reduced because of the large hull area aft of the step which is not in contact with the water at all.

While a preferred embodiment of the present invention has been described, many modifications would be apparent to those skilled in the art without departing from the spirit of the inventive concepts herein described, and such modifications are intended to be encompassed within the scope of the appended claims.

What is claimed is:

1. A hydroplane boat comprising
a hull including two generally V-shaped sections being disposed one aft of the other,
a transverse step in said hull separating said V-shaped sections, and
continuous chines from stem to stern,
wherein the aft hull section comprises two surface portions separated by a central keelson, each of said surface portions being generally concave in the area just aft of said step, and becoming progressively less concave toward the transom of said boat so that at said transom, each of said surface portions is substantially flat and intersects said transom in substantially a straight line.

2. A boat according to claim 1 wherein the deadrise of said aft hull section at said transom exceeds about eighteen degrees.

3. A boat according to claim 2, wherein the deadrise of the forward hull section at said step exceeds the deadrise of said aft hull section at said transom by about three to ten degrees.

4. A boat according to claim 1 or 2, wherein said transverse step is located approximately 50% to 60% of the water line length forward of said transom of said boat.

5. A boat according to claim 1 or 2, having a center of gravity located in the range of about 5% to 15% of the water line length aft of said transverse step.

6. A boat according to claim 1 or 2, further including lift strakes on said forward hull section to provide lift.

7. A boat according to claim 1 or 2, wherein said aft keelson is joined to said transverse step at a point which is in the range of about 1" to 1½" above the forward keelson of said boat at said step for every 1' of chine beam of said boat measured at said step.

8. A boat according to claim 1 or 2, wherein said continuous chines comprise a narrow horizontal surface from stem to stern.

9. A hydroplane boat comprising a hull including two generally V-shaped sections being disposed one aft of the other, a transverse step in said hull separating said V-shaped sections, and means internal to said boat for providing venting to the area of said step, wherein the aft hull section comprises two surface portions separated by a central keelson, each of said surface portions being generally concave in the area just aft of said step, and becoming progressively less concave toward the transom of said boat so that at said transom, each of said surface portions is substantially flat and intersects said transom in substantially a straight line.

10. A boat according to claim 9 wherein the deadrise of said aft hull section at said transom exceeds about eighteen degrees.

11. A boat according to claim 9 or 10, wherein said means for providing venting includes vents located in said transverse step comprising at least about 15% of the surface area of said step.

12. A hydroplane boat comprising a hull including two generally V-shaped sections being disposed one aft of the other, a transverse step in said hull separating said V-shaped sections, means internal to said boat for providing venting to the area of said step, and continuous chines from stem to stern, wherein the aft hull section comprises to surface portions separated by a central keelson, each of said surface portions being generally concave in the area just aft of said step, and becoming progressively less concave toward the transom of said boat so that at said transom, each of said surface portions is substantially flat and intersects said transom in substantially a straight line.

13. A boat according to claim 12 wherein the deadrise of said aft hull section at said transom exceeds about eighteen degrees.

14. A hydroplane boat comprising a hull including two generally V-shaped sections being disposed one aft of the other, and a transverse step in said hull separating said V-shaped sections, wherein the aft hull section comprises two surface portions separated by a central keelson, each of said surface portions being generally concave in the area just aft of said step, and becoming progressively less concave toward the transom of said boat so that at said transom, each of said surface portions is substantially flat and intersects said transom in substantially a straight line.

15. A boat according to claim 14 wherein the deadrise of said aft hull section at said transom exceeds about eighteen degrees.

16. A hydroplane boat comprising a hull including generally V-shaped forward and aft sections separated by a transverse step located approximately 50% to 60% of the water line length forward of the transom of said boat, the deadrise of said aft hull section at said transom exceeding about eighteen degrees and being in the range of about three to ten degrees less than the deadrise of said forward hull section at said step, means internal to said boat for supplying air to vents located in said transverse step, said vents comprising at least about 15% of the surface area of said transverse step, and continuous chines from stem to stern, said boat having a center of gravity located in the range of about 5% to 15% of the water line length aft of said transverse step, and said aft hull section comprising two surface portions separated by a central keelson, each of said surface portions being generally concave in the area just aft of said step, and becoming progressively less concave toward said transom so that at said transom, each of said surface portions is substantially flat and intersects said transom in substantially a straight line.

17. A hydroplane boat comprising a hull including generally V-shaped forward and aft sections separated by a transverse step located approximately 50% to 60% of the water line length forward of the transom of said boat, the deadrise of said aft hull section at said transom exceeding about eighteen degrees and being in the range of about three to ten degrees less than the deadrise of said forward hull section at said step, said aft hull section including two surface portions separated by a central keelson, each of said surface portions being generally concave in the area just aft of said step, and becoming progressively less concave toward said transom so that at said transom, each of said surface portions is substantially flat and intersects said transom in substantially a straight line, and said boat having a center of gravity located in the range of about 5% to 15% of the water line length aft of said transverse step.

18. A hydroplane boat comprising a hull including generally V-shaped forward and aft sections separated by a transverse step located approximately 50% to 60% of the water line length forward of the transom of said boat, the deadrise of said aft hull section at said transom exceeding about eighteen degrees and being in the range of about three to ten degrees less than the deadrise of said forward hull section at said step, and said aft hull section including two surface portions separated by a central keelson, each of said surface portions being generally concave in the area just aft of said step, and becoming progressively less concave toward said transom so that at said transom, each of said surface portions is substantially flat and intersects said transom in substantially a straight line, and means internal to said boat for supplying air to vents located in said transverse step, said vents comprising at least about 15% of the surface area of said transverse step, said boat having a center of gravity located in the range of about 5% to 15% of the water line length aft of said transverse step.

19. A hydroplane boat comprising a hull including generally V-shaped forward and aft sections separated by a transverse step located approximately 50% to 60% of the water line length forward of the transom of said boat, the deadrise of said aft hull section at said transom exceeding about eighteen degrees and being in the range of about three to ten degrees less than the deadrise of said forward hull section at said step, means internal to said boat for supplying air to vents located in said transverse step, said vents comprising at least about 15% of the surface area of said transverse step, continuous chines comprising a narrow horizontal surface from stem to stern, and lift strakes on said forward hull section to provide lift, said boat having a center of gravity located in the range of about 5% to 15% of the water line length aft of said transverse step, and said aft keelson being joined to said transverse step at a point which is in the range of about 1" to 1½" above the forward keelson of said boat at said step for every 1' of chine beam of said boat measured at said step, wherein said aft hull section comprises two surface portions separated by a central keelson, each of said surface portions being generally concave in the area just aft of said step, and becoming progressively less concave toward said transom so that at said transom, each of said surface portions is substantially flat and intersects said transom in substantially a straight line.

* * * * *